United States Patent
Mohtar et al.

(10) Patent No.: US 10,495,100 B2
(45) Date of Patent: Dec. 3, 2019

(54) INLET-ADJUSTMENT MECHANISM FOR TURBOCHARGER COMPRESSOR, HAVING SEALING MEANS PREVENTING RECIRCULATION AND/OR OIL MIGRATION INTO THE MECHANISM

(71) Applicant: Honeywell International Inc., Morris Plains, NJ (US)

(72) Inventors: Hani Mohtar, Lorraine (FR); Stephane Pees, Meurthe-et-Moselle (FR); Alain Lombard, Vosges (FR); Sowmya Bolakonda, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 67 days.

(21) Appl. No.: 15/822,093

(22) Filed: Nov. 24, 2017

(65) Prior Publication Data

US 2019/0162200 A1     May 30, 2019

(51) Int. Cl.
    *F04D 29/16*     (2006.01)
    *F04D 29/08*     (2006.01)
              (Continued)

(52) U.S. Cl.
    CPC ............ *F04D 29/161* (2013.01); *F02B 39/16* (2013.01); *F02C 6/12* (2013.01); *F04D 27/0253* (2013.01); *F04D 29/083* (2013.01); *F04D 29/4213* (2013.01); *F04D 29/462* (2013.01); *F04D 29/464* (2013.01); *F05D 2220/40* (2013.01); *F05D 2250/51* (2013.01)

(58) Field of Classification Search
CPC .. F04D 29/161; F04D 29/4213; F04D 29/462; F04D 29/083; F04D 29/464; F04D 27/0253; F02B 39/16; F05D 2220/40; F02C 6/12
USPC .................................................. 60/605.1–612
See application file for complete search history.

(56) References Cited

U.S. PATENT DOCUMENTS

| | | | |
|---|---|---|---|
| 4,122,668 A | | 10/1978 | Chou et al. |
| 6,145,313 A | * | 11/2000 | Arnold .................... F02B 37/00 60/605.2 |

(Continued)

FOREIGN PATENT DOCUMENTS

| | | |
|---|---|---|
| DE | 102010026176 A1 | 1/2012 |
| DE | 102011121996 B4 | 6/2013 |

(Continued)

*Primary Examiner* — Hoang M Nguyen
(74) *Attorney, Agent, or Firm* — John C. James (57) ABSTRACT

A turbocharger compressor includes an inlet-adjustment mechanism operable to move between an open position and a closed position. The mechanism includes a plurality of movable blades disposed about the compressor air inlet and located between an upstream wall surface and a downstream wall surface of an annular space within the air inlet wall. The blades move radially inward from the annular space into the air inlet when the blades are in the closed position so as to form an orifice of reduced diameter relative to a nominal diameter of the inlet. Recirculation of air upstream through the mechanism is prevented by a downstream blade seal. When EGR is employed, an upstream blade seal is included, preventing oil-laden air from migrating into the mechanism. The blade seals can be of various types, including O-ring seals or labyrinth seals.

12 Claims, 8 Drawing Sheets

(51) Int. Cl.
*F02B 39/16* (2006.01)
*F02C 6/12* (2006.01)
*F04D 29/46* (2006.01)
*F04D 27/02* (2006.01)
*F04D 29/42* (2006.01)

(56) References Cited

U.S. PATENT DOCUMENTS

| | | | |
|---|---|---|---|
| 6,951,450 B1* | 10/2005 | Figura | F01D 9/026 |
| | | | 415/164 |
| 2005/0060999 A1* | 3/2005 | Mulloy | F01D 17/14 |
| | | | 60/602 |
| 2006/0010864 A1* | 1/2006 | Mulloy | F01D 17/143 |
| | | | 60/602 |
| 2014/0308110 A1 | 10/2014 | Houst et al. | |

FOREIGN PATENT DOCUMENTS

| | | |
|---|---|---|
| DE | 102013003418 A1 | 8/2014 |
| WO | 2013074503 A1 | 5/2013 |
| WO | 2016041024 A2 | 3/2016 |

* cited by examiner

PRIOR ART

INLET-ADJUSTMENT MECHANISM FOR TURBOCHARGER COMPRESSOR, HAVING SEALING MEANS PREVENTING RECIRCULATION AND/OR OIL MIGRATION INTO THE MECHANISM

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

Applicant's co-pending U.S. patent application Ser. No. 15/446,054 filed on Mar. 1, 2017, which claims the benefit of the filing date of Provisional Application No. 62/324,488 filed on Apr. 20, 2016, the entire disclosures of said applications being hereby incorporated herein by reference, describes mechanisms and methods for a centrifugal compressor that can enable the surge line for the compressor to selectively be shifted to the left (i.e., surge is delayed to a lower flow rate at a given pressure ratio). One embodiment described in said applications comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and pivotable radially inwardly and radially outwardly between an open position and a closed position, the inlet-adjustment mechanism comprising a plurality of blades disposed about the air inlet and each pivotable about one end of the blade, the blades pivoting radially inwardly through a slot in the air inlet wall when the blades are in the closed position so as to form an orifice of reduced diameter relative to a nominal diameter of the inlet.

Applicant is also the owner of additional applications directed to other inlet-adjustment mechanisms employing moving blades, including U.S. application Ser. No. 15/446,090 filed on Mar. 1, 2017, the entire disclosure of which is hereby incorporated herein by reference.

The present disclosure concerns inlet-adjustment mechanisms generally of the type described in the aforementioned '054, '488, and '090 applications, and particularly concerns modifications or redesigns of such mechanisms that aim to improve upon certain aspects of said mechanisms.

BRIEF SUMMARY OF THE DISCLOSURE

One such aspect of the aforementioned inlet-adjustment mechanisms for which improvement is sought concerns a tendency for air to leak upstream past the mechanism, back into the air inlet, when the blades are moved to the closed position. This leakage or "flow recirculation" reduces the overall compressor efficiency by a substantial amount.

Another such aspect for which improvement is sought concerns engine/turbocharger systems in which exhaust gas recirculation (EGR) is employed as a means of reducing nitrous oxide emissions. The exhaust gases that are recirculated back to the compressor inlet are laden with oil, and the oil-laden air tends to migrate into the inlet-adjustment mechanism, which can foul the mechanism and cause operational problems.

The present disclosure addresses the above-noted aspects of inlet-adjustment mechanisms for turbocharger compressors.

In accordance with one embodiment disclosed herein, there is described a turbocharger having the following features:
- a turbine housing and a turbine wheel mounted in the turbine housing and connected to a rotatable shaft for rotation therewith, the turbine housing receiving exhaust gas and supplying the exhaust gas to the turbine wheel;
- a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel, the air inlet wall defining an annular space surrounding the air inlet and open to the air inlet at a radially inner end of the annular space; and
- a compressor inlet-adjustment mechanism disposed in the annular space of the air inlet wall and movable between an open position and a closed position, the inlet-adjustment mechanism comprising a plurality of blades disposed between an upstream wall surface and a downstream wall surface within the annular space, the blades collectively circumscribing an orifice, an upstream surface of each blade opposing the upstream wall surface and a downstream surface of each blade opposing the downstream wall surface, the blades being movable inwardly from the annular space into the air inlet when the blades are in the closed position so as to cause the orifice to have a reduced diameter relative to a nominal diameter of the inlet; and
- at least one of an upstream blade seal formed between the upstream wall surface and an upstream sealing surface defined by each blade when the blades are moved inwardly to the closed position, and a downstream blade seal formed between the downstream wall surface and a downstream sealing surface defined by each blade when the blades are moved inwardly to the closed position.

In one embodiment, the upstream blade seal comprises an upstream seal ring supported by the upstream wall, the upstream sealing surface of each blade contacting and sealing against the upstream seal ring when the blades are moved inwardly to the closed position.

In one embodiment, the downstream blade seal comprises a downstream seal ring supported by the downstream wall surface, the downstream sealing surface of each blade contacting and sealing against the downstream seal ring when the blades are moved inwardly to the closed position.

In another embodiment, the upstream blade seal comprises a labyrinth seal, wherein one of the upstream wall surface and the upstream sealing surface of each blade defines a groove, and the other of the upstream wall surface and the upstream sealing surface defines a tongue that fits into the groove when the blades are moved inwardly to the closed position.

In one embodiment, the downstream blade seal comprises a labyrinth seal, wherein one of the downstream wall surface and the downstream sealing surface of each blade defines a groove, and the other of the downstream wall surface and the downstream sealing surface defines a tongue that fits into the groove when the blades are moved inwardly to the closed position.

In one embodiment, there is only the downstream blade seal, which prevents or substantially reduces leakage flow in an upstream direction past the inlet-adjustment mechanism (also called "flow recirculation" herein) back into the air inlet.

In another embodiment, there is only the upstream blade seal, which prevents or substantially reduces migration of oil-laden air into the inlet-adjustment mechanism when the turbocharger is used in an engine system that includes exhaust gas recirculation to the compressor.

In a further embodiment, the inlet-adjustment mechanism includes both the upstream and downstream blade seals. Thus, both flow recirculation and oil migration are prevented or substantially reduced.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as moving "radially" inwardly or outwardly, the term "radially" does not preclude some non-radial component of movement of the blades (for example, the blades may occupy a plane that is angled slightly with respect to the rotational axis of the compressor, such that when the blades pivot radially inwardly and outwardly, they also move with a small axial component of motion). When referring to the blade seals, "upstream" and "downstream" refer to the main flow direction in the compressor inlet, such that "downstream" means the axial direction that air normally proceeds toward the compressor wheel, and "upstream" means a direction axially opposite to the "downstream" direction.

Figure 1:
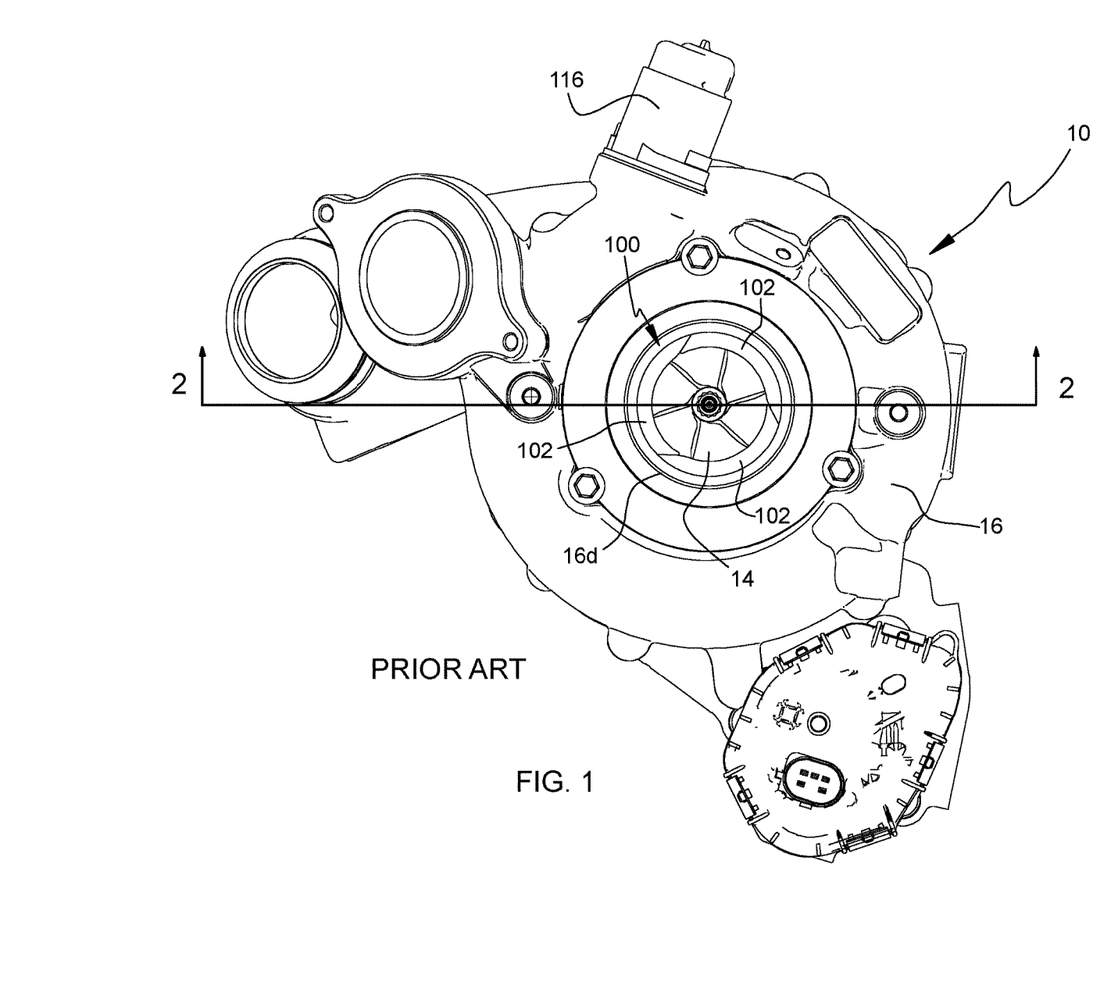
FIG. 1 is an end view of a turbocharger that does not include blade seals in accordance with the present invention, looking axially from the compressor end toward the turbine end of the turbocharger.
Figure 2:
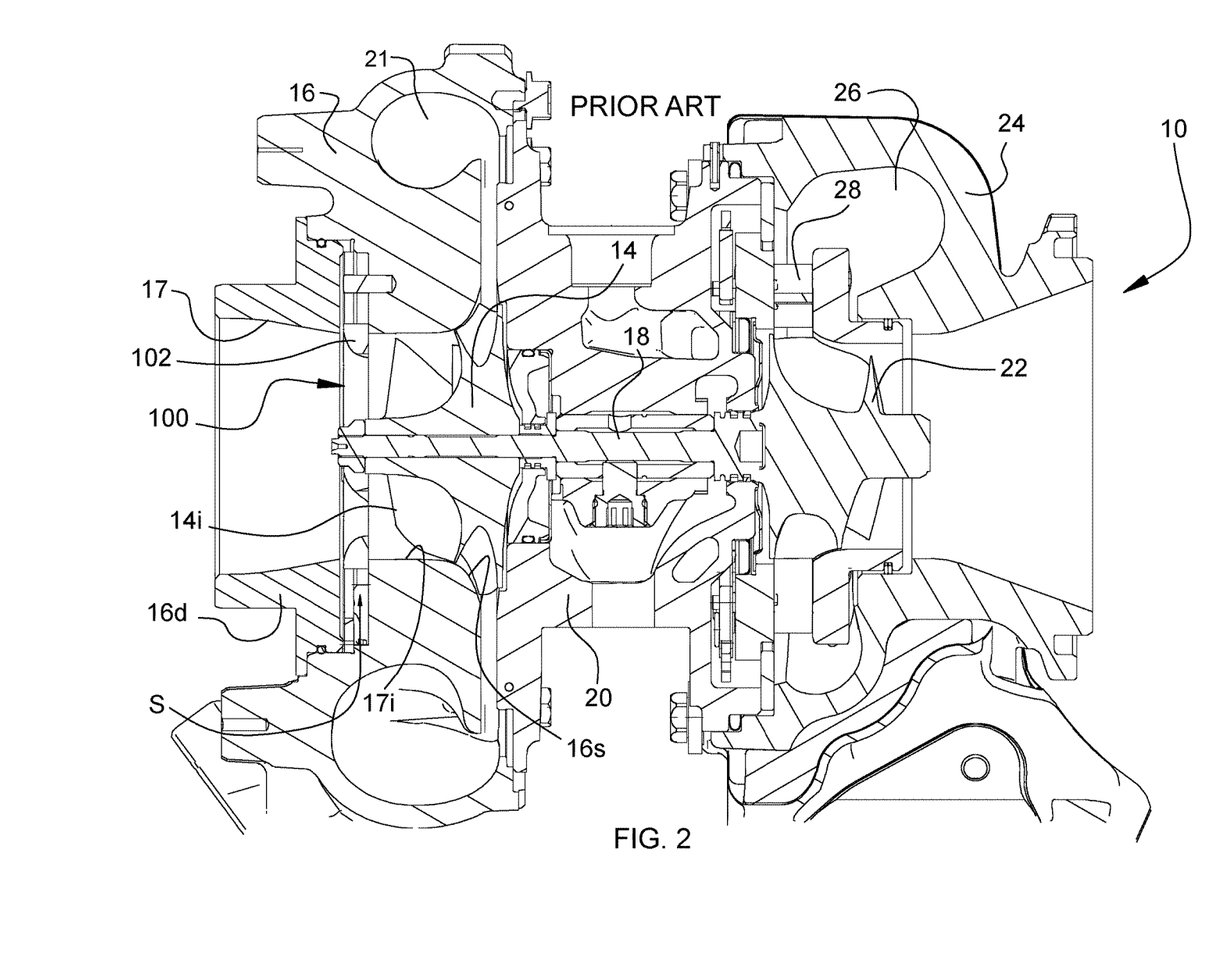
FIG. 2 is a cross-sectional view of the turbocharger along line 2-2 in FIG. 1.
Figure 3:
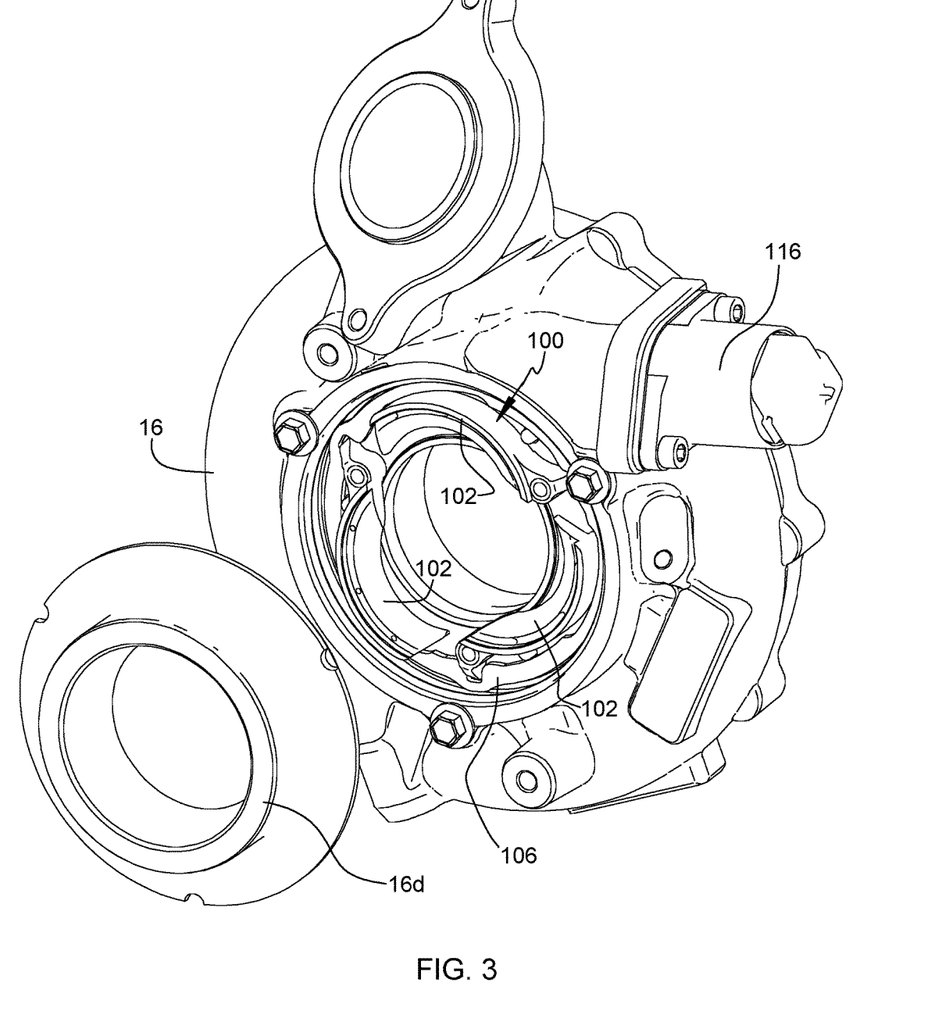
FIG. 3 is a partially exploded view of a compressor portion of a turbocharger in accordance with one embodiment of the present invention.
Figure 4:
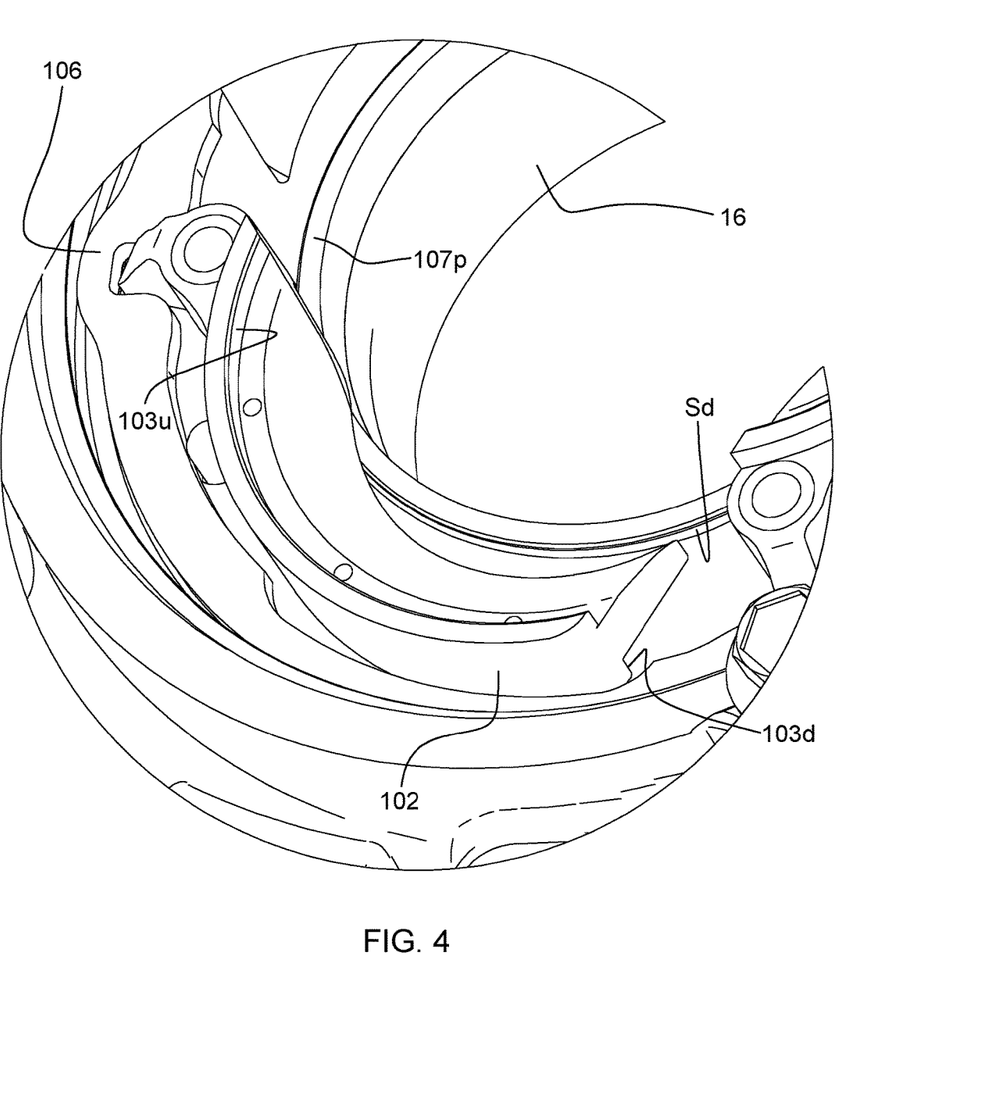
FIG. 4 a magnified view of the compressor portion of FIG. 3, with the compressor cover (inlet duct member) exploded away so that the inlet-adjustment mechanism is visible.
Figure 5:
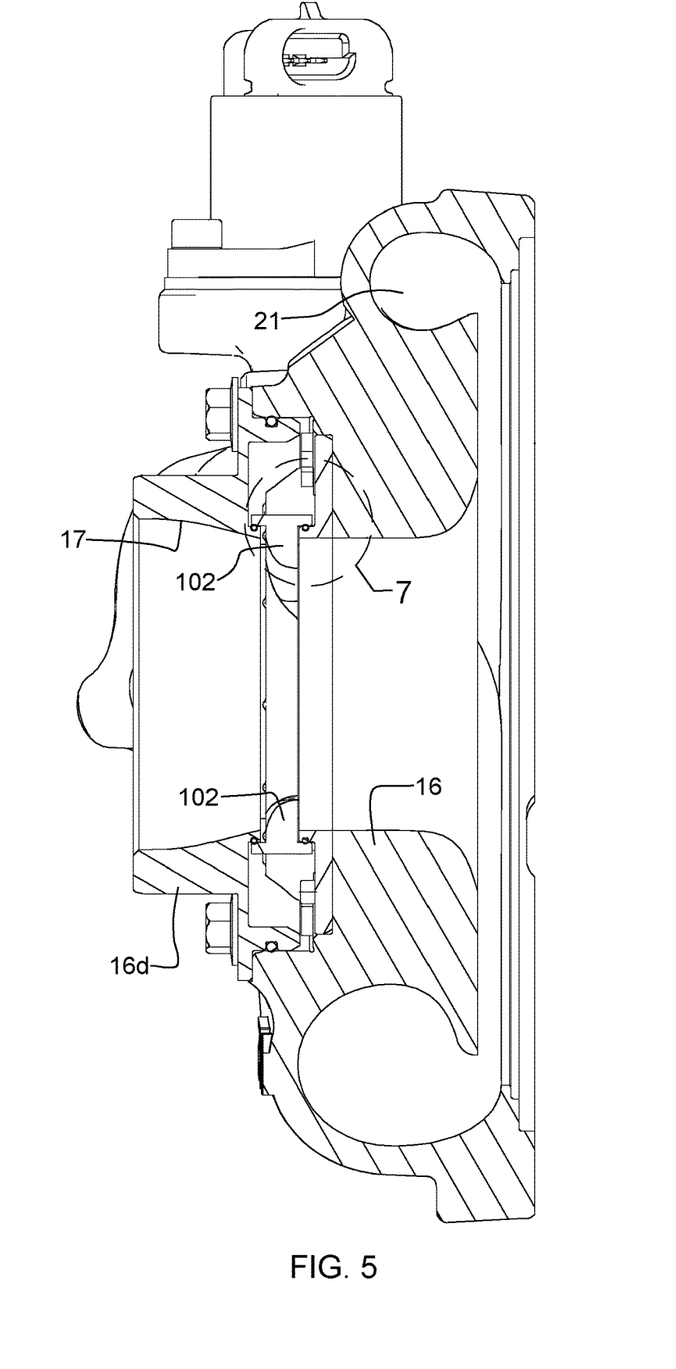
FIG. 5 is an axial cross-sectional view of the compressor portion of FIG. 3, with the inlet-adjustment mechanism in a closed position so that the blades engage the seal rings of the blade seals.

A turbocharger 10 of the type to which the invention is applicable, but which lacks blade seals in accordance with the invention, is illustrated in axial end view in FIG. 1, and an axial cross-sectional view of the turbocharger is shown in FIG. 2. The turbocharger 10 is substantially as described in Applicant's commonly owned and co-pending application Ser. No. 15/806,267 filed on Nov. 7, 2017, the entire disclosure of which is hereby incorporated herein by reference. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

With reference to FIGS. 1 and 2, in the illustrated embodiment, the wall that defines the air inlet 17 is formed in part by the compressor housing 16 and in part by a separate cover or inlet duct member 16d that is received into a cylindrical receptacle defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the compressor blades. The shroud surface defines a curved contour that is generally parallel to the contour of the compressor wheel.

The compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16d. The annular space is bounded between an upstream wall surface 105 and a downstream wall surface 107 (see FIG. 6). The inlet-adjustment mechanism is operable for adjusting an effective diameter of the air inlet into the compressor wheel. As such, the inlet-adjustment mechanism is movable between an open position and a closed position, and can be configured to be adjusted to various points intermediate between said positions.

With reference to FIG. 1, the inlet-adjustment mechanism comprises a plurality of blades 102 arranged about the central axis of the air inlet and each pivotable about a pivot pin located at or near one end of the blade. In the illustrated embodiment, the pivot pins for the blades are secured in the downstream wall surface 107 of the compressor housing. The blades are arranged between the upstream wall surface 105 and the downstream wall surface 107, with a small amount of axial clearance or play for the blades between those wall surfaces, so that the blades can freely pivot without binding.

The inlet-adjustment mechanism further comprises a unison ring 106 for imparting pivotal movement to the blades. The unison ring surrounds the assembly of the blades 102 and is substantially coplanar with the blades, and is rotatable about an axis that coincides with the rotation axis of the compressor wheel. The unison ring includes a plurality of recesses in its radially inner periphery, and each blade includes an end portion that is engaged in a respective one of the recesses. Accordingly, rotation of the unison ring in one direction causes the blades 102 to pivot radially inwardly, and rotation of the unison ring in the other direction causes the blades to pivot radially outwardly. The assembly of the blades 102 and unison ring 106 is captively retained between the upstream wall surface 105 and the downstream wall surface 107.

The radially inner edges of the blades 102 include portions that preferably are generally circular arc-shaped and these edges collectively surround and bound a generally circular opening or orifice (although the degree of roundness varies depending on the positions of the blades, as further described below).

The range of pivotal movement of the blades is sufficient that the blades can be pivoted radially outwardly (by rotation of the unison ring in one direction) to an open position in which the blades are entirely radially outward of the inner surface 17i (FIG. 2) of the inlet. As such, in the open position of the blades, the inlet-adjustment mechanism does not alter the nominal inlet diameter as defined by the inlet surface 17i.

Figure 6:
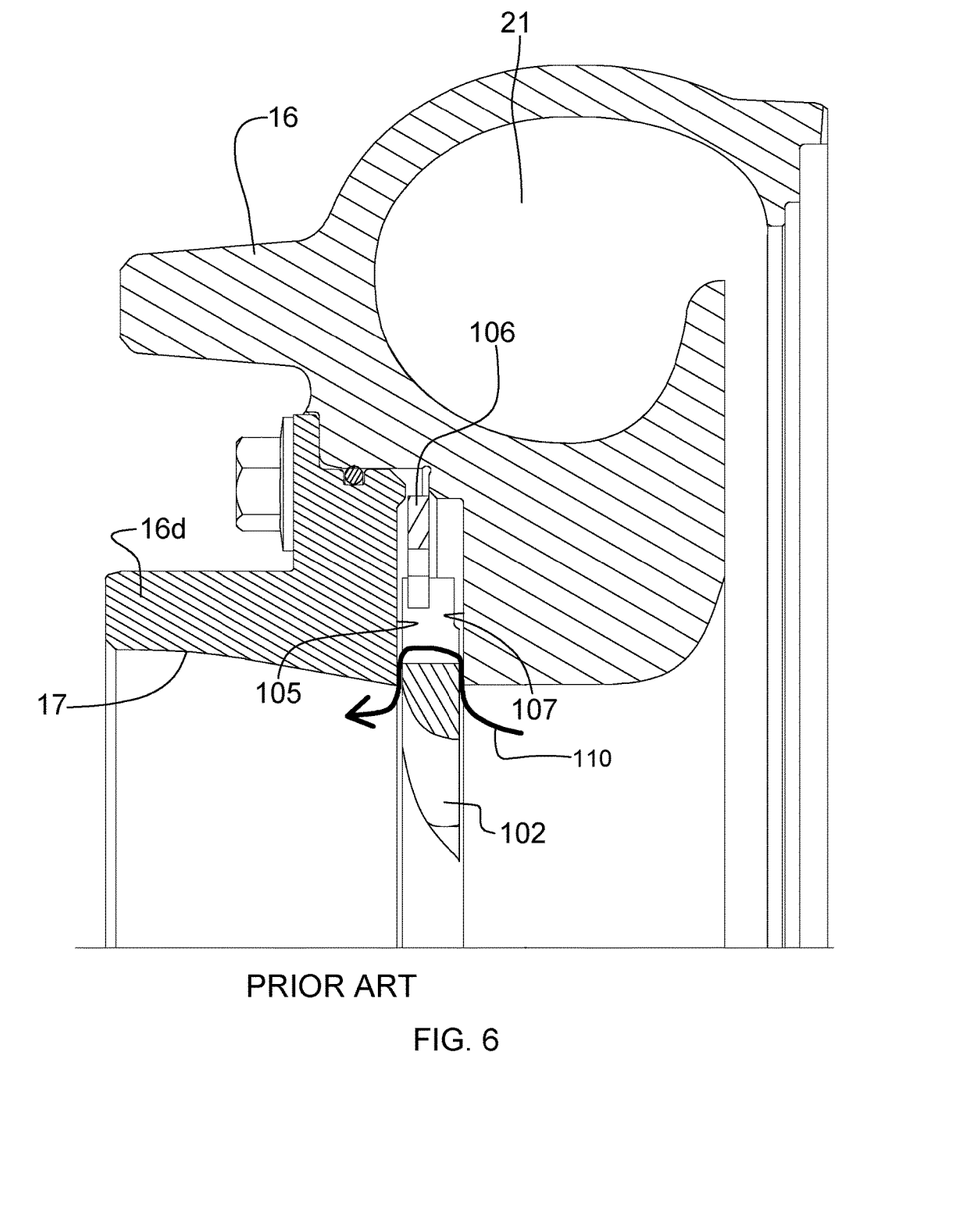
FIG. 6 is an axial view of a compressor portion and inlet-adjustment mechanism in a closed position similar to FIG. 5, but wherein the inlet-adjustment mechanism lacks blade seals.

The blades can also be pivoted radially inwardly (by rotation of the unison ring in the opposite direction) to a closed position as shown in FIGS. 2 and 6. In the closed position, the circular-arc edges along the radially inner sides of the blades collectively form an orifice that is substantially a circle having a diameter that is less than that of the inlet surface 17i. ("Substantially a circle" in the present disclosure means that the circular-arc edges all lie on the same circle and collectively occupy at least 80% of the circumference of that circle.) This has the consequence that the effective diameter of the inlet is reduced relative to the nominal inlet diameter. Thus, the inlet-adjustment mechanism causes the effective diameter of the inlet to be further reduced relative to the closed position. In this manner, the inlet-adjustment mechanism is able to regulate the effective diameter of the air inlet approaching the compressor wheel.

As previously described, the blades 102 are actuated to pivot between their open and closed positions by the unison ring 106 that is rotatable about the center axis of the air inlet. Referring now to FIG. 1, rotational motion is imparted to the unison ring by an actuator 116 that is received into a receptacle defined in the compressor housing. The actuator includes an actuator rod that extends through a space defined in the compressor housing and is affixed at its distal end to a pin that engages a slot in the outer periphery of the unison ring 106. The actuator is operable to extend and retract the rod linearly along its length direction so as to rotate the unison ring 106 and thereby actuate the blades 102. Extending the rod pivots the blades towards the closed position and retracting the rod pivots the blades toward the open position.

As noted, the inlet-adjustment mechanism 100 enables adjustment of the effective size or diameter of the inlet into the compressor wheel 14. As illustrated in FIG. 2, when the inlet-adjustment mechanism is in the closed position, the effective diameter of the inlet into the compressor wheel is dictated by the inside diameter defined by the blades 102. In order for this effect to be achieved, the axial spacing distance between the blades and the compressor wheel must be as small as practicable, so that there is insufficient distance downstream of the blades for the flow to expand to the full diameter of the inducer portion of the compressor wheel 14 by the time the air encounters it. The inlet diameter is thereby effectively reduced to a value that is dictated by the blades.

At low flow rates (e.g., low engine speeds), the inlet-adjustment mechanism 100 can be placed in the closed position of FIGS. 2 and 6. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

As noted, FIGS. 1, 2, and 6 illustrate a turbocharger that does not include blade seals in accordance with the invention. With further reference to FIG. 6, a phenomenon that has been noted by Applicant is that at near-surge operating conditions, when the inlet-adjustment mechanism is closed as in FIG. 6 so as to reduce or eliminate the potential for surge to occur, a portion of the air that is approaching the compressor wheel can recirculate through a gap between the downstream surfaces of the blades 102 and the downstream wall surface 107, into the cavity for the inlet-adjustment mechanism, and then back into the inlet 17 of the compressor via a gap between the upstream surfaces of the blades 102 and the upstream wall surface 105. This recirculation is diagrammatically denoted by the curved arrow 110 in FIG. 6. Such flow recirculation can significantly reduce the overall compressor efficiency.

With reference to FIGS. 3, 4, 5, and 7, a first embodiment of the present invention is illustrated, having one or more blade seals for the blades 102 of the inlet-adjustment mechanism. More particularly, with specific reference to FIG. 7, the illustrated embodiment includes an upstream blade seal 115 and a downstream blade seal 117 each comprising an O-ring type seal. The upstream blade seal 115 comprises an upstream seal ring Su supported by the upstream wall surface 105, and an upstream sealing surface 103$u$ defined by each blade 102. The upstream sealing surface 103$u$ of each blade contacts and seals against the upstream seal ring Su when the blades are moved inwardly to the closed position as in FIG. 7.

The downstream blade seal 117 comprises a downstream seal ring Sd supported by the downstream wall surface 107, and a downstream sealing surface 103$d$ defined by each blade 102. The downstream sealing surface 103$d$ of each blade contacts and seals against the downstream seal ring Sd when the blades are moved inwardly to the closed position as in FIG. 7.

Figure 7:
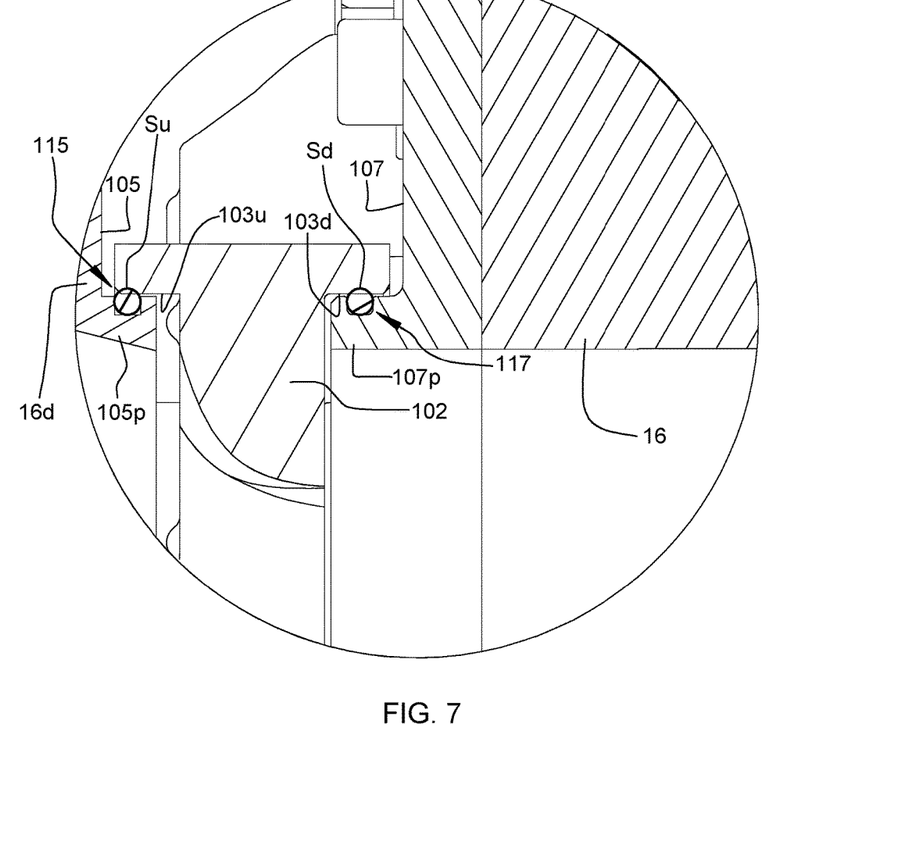
FIG. 7 is a magnified portion of FIG. 5 to show more clearly the structure and function of the blade seals.

In the first embodiment, the upstream wall 105 defines a portion 105$p$ that extends in a direction having a downstream axial directional component, and the upstream seal ring Su is supported on a radially outer side of said portion 105$p$, such as being retained in an annular groove formed in said portion as illustrated. Correspondingly, each blade 102 at its upstream side defines a portion that extends with an upstream axial directional component and the upstream sealing surface 103$u$ is defined by said portion such that the upstream sealing surface will engage the upstream seal ring when each blade is in the closed position.

Similarly, in the illustrated embodiment, the downstream wall 107 defines a portion 107$p$ that extends in a direction having an upstream axial directional component, and the downstream seal ring Sd is supported on a radially outer side of said portion 107$p$, such as being retained in an annular groove formed in said portion as illustrated. Correspondingly, each blade 102 at its downstream side defines a portion that extends with a downstream axial directional component and the downstream sealing surface 103$d$ is defined by said portion such that the downstream sealing surface will engage the downstream seal ring when each blade is in the closed position.

Alternatively, one or both of the upstream and downstream walls 105 and 107 may lack the axially extending portions 105$p$ and 107$p$ and one or both of the seal rings Su and Sd can be supported in an annular groove formed in the radially extending portion of the wall 105 and/or 107. The radially extending face(s) of the blade 102 can engage the seal ring(s) supported in that fashion so as to form the blade seal(s).

Figure 8:
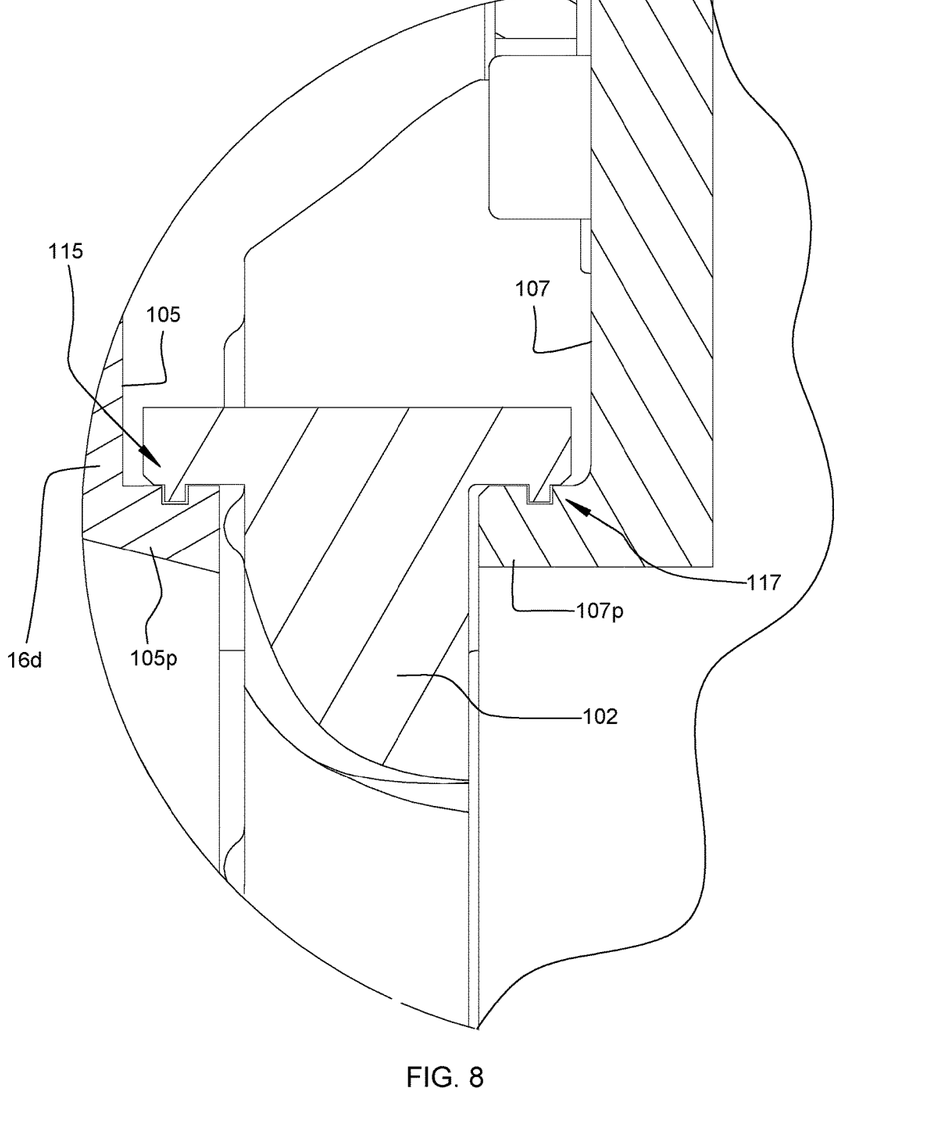
FIG. 8 is a view similar to FIG. 7, showing another embodiment of the invention having labyrinth seals instead of O-ring type seals.

It will be understood, however, that the blade seals 115 and 117 in accordance with the invention can have any of various configurations. For example, FIG. 8 illustrates a second embodiment of the invention that does not have O-ring type seals. Rather, the blade seals 115 and 117 in this embodiment are labyrinth seals that function by creating a narrow and tortuous pathway for leakage flow, so as to discourage such leakage. Thus, each labyrinth seal 115, 117 comprises a groove and a corresponding tongue or rib that fits into the groove when the blades are in the closed position as in FIG. 8. In the illustrated embodiment, the groove for the upstream seal is formed in the portion 105$p$ of the upstream wall surface, and the tongue for the upstream seal is formed on the portion of the blade 102 that extends axially upstream. Similarly, the groove for the downstream seal is formed in the portion 107$p$ of the downstream wall surface, and the tongue for the downstream seal is formed on the portion of the blade that extends axially downstream. Alternatively, the portions 105p and 107p could define the tongues, and the blades could define the grooves.

The downstream blade seal 117 is effective for reducing or eliminating flow recirculation (see arrow 110 in FIG. 6) when the blades 102 are closed, and can be used alone (i.e., without the presence of the upstream blade seal 115) for that purpose.

The upstream blade seal 115 has advantages for reasons distinct from the flow recirculation phenomenon. When a turbocharger in accordance with the present invention is employed in an engine-turbocharger system that includes exhaust gas recirculation (EGR) for reducing nitrogen-oxide emissions under certain operating conditions (which operating conditions tend to occur when it is desirable to close the inlet-adjustment mechanism 100), the oil-laden exhaust gases introduced into the compressor inlet can migrate into the cavity of the inlet-adjustment mechanism. Fouling of the mechanism by the oil can then occur. The upstream blade seal in accordance with the invention can reduce or eliminate such migration of oil into the inlet-adjustment mechanism.

In accordance with some embodiments of the invention, the turbocharger can include only the downstream blade seal 117 but not the upstream blade seal 115. In other embodiments, the turbocharger can include only the upstream blade seal but not the downstream blade seal. In still other embodiments, such as illustrated particularly in FIG. 7, the turbocharger can include both blade seals.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs three blades 102, the invention is not limited to any particular number of blades. The invention can be practiced with as few as two blades, or as many as 12 blades or more. The greater the number of blades, the more-nearly circular the opening circumscribed by the blades can be (although generally the opening can be circular in only one position of the blades). Accordingly, the number of blades can be selected as desired, taking into account the greater complexity with a greater number of blades, which may offset the advantage of increased circularity. Additionally, in the illustrated embodiment the blades are configured so that the opening circumscribed by the blades is approximately circular when the blades are in the closed position. Alternatively, however, the blades can be configured so that the opening is non-circular in the closed position. Moreover, while blades with circular-arc edges have been illustrated and described, the blades do not have to have circular-arc edges. Blades with edges of different shapes (linear, elliptical, etc.) are also included within the scope of the invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
   a turbine housing and a turbine wheel mounted in the turbine housing and connected to a rotatable shaft for rotation therewith, the turbine housing receiving exhaust gas and supplying the exhaust gas to the turbine wheel;
   a centrifugal compressor assembly comprising a compressor housing and a compressor wheel mounted in the compressor housing and connected to the rotatable shaft for rotation therewith, the compressor housing having an air inlet wall defining an air inlet for leading air generally axially into the compressor wheel, the air inlet wall defining an annular space surrounding the air inlet and open to the air inlet at a radially inner end of the annular space; and
   a compressor inlet-adjustment mechanism disposed in the annular space of the air inlet wall and movable between an open position and a closed position, the inlet-adjustment mechanism comprising a plurality of blades disposed between an upstream wall surface and a downstream wall surface within the annular space, the blades collectively circumscribing an orifice, an upstream surface of each blade opposing the upstream wall surface and a downstream surface of each blade opposing the downstream wall surface, the blades being movable inwardly from the annular space into the air inlet when the blades are in the closed position so as to cause the orifice to have a reduced diameter relative to a nominal diameter of the inlet; and
   at least one of an upstream blade seal formed between the upstream wall surface and an upstream sealing surface defined by each blade when the blades are moved inwardly to the closed position, and a downstream blade seal formed between the downstream wall surface and a downstream sealing surface defined by each blade when the blades are moved inwardly to the closed position.

2. The turbocharger of claim 1, wherein the upstream blade seal is present and comprises an upstream seal ring supported by the upstream wall surface and an upstream sealing surface defined by each blade, the upstream sealing surface contacting and sealing against the upstream seal ring when the blades are moved inwardly to the closed position.

3. The turbocharger of claim 1, wherein the downstream blade seal is present and comprises a downstream seal ring supported by the downstream wall surface and a downstream sealing surface defined by each blade, the downstream sealing surface contacting and sealing against the downstream seal ring when the blades are moved inwardly to the closed position.

4. The turbocharger of claim 1, wherein the upstream blade seal is present and comprises a labyrinth seal, wherein one of the upstream wall surface and the upstream sealing surface of each blade defines a groove, and the other of the upstream wall surface and the upstream sealing surface defines a tongue that fits into the groove when the blades are moved inwardly to the closed position.

5. The turbocharger of claim 1, wherein the downstream blade seal is present and comprises a labyrinth seal, wherein one of the downstream wall surface and the downstream sealing surface of each blade defines a groove, and the other of the downstream wall surface and the downstream sealing surface defines a tongue that fits into the groove when the blades are moved inwardly to the closed position.

6. The turbocharger of claim 1, wherein the downstream blade seal is present but the upstream blade seal is absent.

7. The turbocharger of claim 6, wherein the downstream wall surface defines a wall portion that extends along a direction with an upstream axial directional component, and the downstream seal ring is supported on a radially outer side of said wall portion, and each blade at an upstream side thereof defines a blade portion that extends with an upstream axial directional component and the upstream sealing surface is defined by said blade portion.

8. The turbocharger of claim 1, wherein the upstream blade seal is present but the downstream blade seal is absent.

9. The turbocharger of claim 8, wherein the upstream wall surface defines a wall portion that extends along a direction with a downstream axial directional component, and the upstream seal ring is supported on a radially outer side of said wall portion, and each blade at a downstream side thereof defines a blade portion that extends with a downstream axial directional component and the downstream sealing surface is defined by said blade portion.

10. The turbocharger of claim 1, wherein both the upstream and downstream blade seals are present.

11. The turbocharger of claim 10, wherein the upstream and downstream blade seals comprise O-ring type seals.

12. The turbocharger of claim 10, wherein the upstream and downstream blade seals comprise labyrinth type seals.

* * * * *